United States Patent [19]

Suzuki et al.

[11] Patent Number: 4,918,615

[45] Date of Patent: Apr. 17, 1990

[54] BUILDING MANAGEMENT SYSTEM

[75] Inventors: Masashi Suzuki, Tokyo; Minoru Yagishita, Kanagawa, both of Japan

[73] Assignee: Yamatake-Honeywell Co., Ltd., Tokyo, Japan

[21] Appl. No.: 248,128

[22] Filed: Sep. 23, 1988

[30] Foreign Application Priority Data

Sep. 23, 1987 [JP] Japan ............................. 62-238476

[51] Int. Cl.⁴ ...................... G06F 15/20; G08C 19/16
[52] U.S. Cl. .................................. 364/505; 364/550; 364/140; 364/138; 307/38; 340/825.06
[58] Field of Search ............... 364/550, 505, 506, 512, 364/551.01, 138, 148, 140, 152; 340/825.52, 825.06, 825.07, 825.15; 307/38, 40

[56] References Cited

U.S. PATENT DOCUMENTS

| | | | |
|---|---|---|---|
| 4,217,646 | 8/1980 | Caltagirone et al. | 364/505 |
| 4,430,828 | 2/1984 | Oglevee et al. | 364/505 |
| 4,476,535 | 10/1984 | Loshing et al. | 364/550 |
| 4,602,343 | 7/1986 | Dougherty | 364/138 |
| 4,630,221 | 12/1986 | Heckenbach et al. | 364/505 |
| 4,661,914 | 4/1987 | Mulokey et al. | 364/505 |
| 4,675,828 | 6/1987 | Winston | 364/505 |
| 4,718,025 | 1/1988 | Minor et al. | 364/550 |
| 4,791,547 | 12/1988 | Petroff | 364/138 |

*Primary Examiner*—Parshotam S. Lall
*Assistant Examiner*—Brian M. Mattson
*Attorney, Agent, or Firm*—Staas & Halsey

[57] ABSTRACT

A building management system enables error-free operation of utility devices in the building by limiting an operator's access to controls for the utility devices to those devices that the operator is authorized to control. The system includes a terminal unit and a central station. The operator inputs various commands via the terminal unit, and the central station verifies that the operator entering the commands is authorized to control the devices designated by the commands before performing the input operation command. The system also verifies that the input operation command is a correct command.

6 Claims, 7 Drawing Sheets

FIG. 3

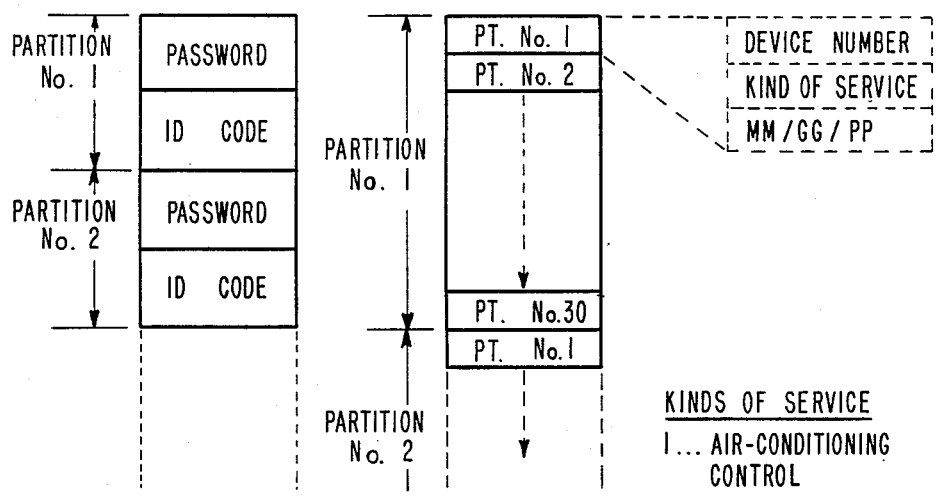

KINDS OF SERVICE
1... AIR-CONDITIONING CONTROL
2... LIGHTING CONTROL
3... TEMPERATURE MEASUREMENT
4... HUMIDITY MEASUREMENT

FIG. 4

| TELEPHONE BUTTON CONTROL | VOICE RESPONSE |
|---|---|
| ☐☐☐☐☐ (INPUT; EXTENSION No. OF CENTRAL STATION) | ① THIS IS THE BUILDING MANAGEMENT CENTER SPEAKING<br>② PLEASE INFORM US OF YOUR ID NUMBER. |
| 1 1 1 # (ID NUMBER) | ③ THE NUMBER IS 111, ISN'T IT?<br>④ PLEASE INPUT THE PASSWORD. |
| 1 1 1 # (PASSWORD) | ⑤ PLEASE CHOOSE THE SERVICE. |
| 1 1 0 # (1) KIND OF SERVICE:1 (2) DEVICE No.:1 (3) CONTROL: OFF | ⑥ AIR CONDITIONER No.1 IS TO BE OFF, ISN'T IT?<br>⑦ PLEASE INPUT THE CONFIRMATION. |
| # (CONFIRMATION) | ⑧ IT WAS TURNED OFF JUST NOW. |

⌐ : FAN COIL UNIT IS OFF

⌐≈ : FAN COIL UNIT IS ON

∪ : LIGHT IS OFF

☼ : LIGHT IS ON

🕓 : TIME SCHEDULE

▯ : ELECTRIC LOCK IS ON

🌡 : TEMPERATURE MEASUREMENT

FIG. 9

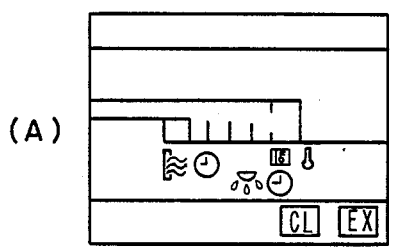
(A)

(A)
TOUCH [icon] OF LOWER TENANT ON TOUCH PANEL WITH FINGER

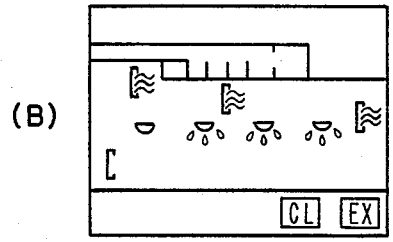
(B)

(B)
GRAPHIC DISPLAY OF AIR-CONDITIONING AND LIGHTING;
CURRENT STATE OF DEVICE;

WHEN TO START FAN COIL UNIT CURRENTLY NOT IN USE, TOUCH [icon] ON TOUCH PANEL SCREEN WITH FINGER.

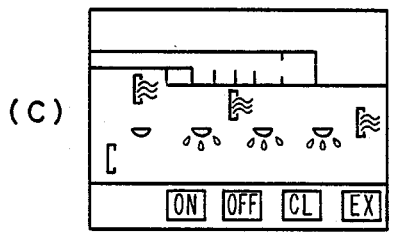
(C)

(C)
ICONS [ON] AND [OFF] IN SCREEN LOWER PORTION;

TOUCH [ON] ON TOUCH PANEL SCREEN WITH FINGER.

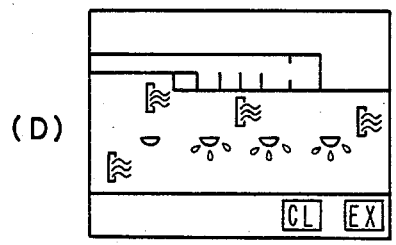
(D)

(D)
[icon] ON SCREEN CHANGES TO [icon];
FAN COIL UNIT STARTS TO OPERATE.

BUILDING MANAGEMENT SYSTEM

BACKGROUND OF THE INVENTION

1. Field of the Invention

This invention relates to a building management system for an office building or the like which is installed in a convenient location.

2. Description of the Related Art

Recently, with the development of various control apparatus and information processing apparatus, a building management system has been proposed for efficiently managing an office building and the like requiring the help of only a few personnel. In the above management system, terminal units (such as a telephone set) are kept in communication with a central control apparatus (a central management station), and the central control apparatus controls the utility devices of the building, such as air-conditioning equipment, lighting equipment and electric locks. The system also measures the environmental data of the building, such as temperature, and performs other actions to effectively achieve building management, including environmental protection.

For specifying the utility device to be controlled in the above prior art system, every utility device is subjected to hierarchization so that readout of the state of each utility device, transmission of each control command, etc., can be performed by designating an address set for each hierarchy. For example, three hierarchies are named "module", "group" and "point" in the order of descending hierarchy. Each subject of control is represented by a number, MM/GG/PP, with each hierarchy having a two-digit value. For example, the "module" hierarchy is represented by a two-digit number MM, the "group" hierarchy is represented by a two-digit number GG, and the "point" hierarchy is represented by a two-digit number PP. When controlling or managing the state of a given utility device, a terminal unit is operated to input the data of each of the two digit numbers MM/GG/PP. The hierarchization is carried out based on the layout of building facilities. For example, where a building has a large number of floors, each floor makes up one group and a plurality of floors makes up one module. By contrast, in a small-sized building, each room makes up one group and a plurality of rooms makes up one module. The foregoing MM/GG/PP is a numerical value (number) defined from the standpoint of instrument facilities. Consequently, when controlling the terminal unit, a user (e.g., a tenant employee) operating various facilities of the building has to perform an input operation, relying on memory or consulting a list of the numbers to designate the desired device. This procedure can be troublesome and tends to cause errors (for example, incorrect input). Therefore, a utility device different from the device intended to be the subject of control could be erroneously actuated, resulting in inconvenience and inefficient building management.

SUMMARY OF THE INVENTION

It is an object of the present invention to provide a terminal unit for management of a building which is adapted for use in a building management system and is easy to operate for the users of various utility facilities of the building and which can control a designated utility device.

According to the present invention, a building management system comprises a plurality of terminal units installed in a building and a central station. Each terminal unit has a control section for inputting both an ID code designating a partition of the building which an operator is allowed to control and data specifying a utility device in the partition and control commands therefor, and a response output section for outputting a response from the central station corresponding to the input received through the control section. The central station has a file designating a partition of the building corresponding to the ID code, a classified-by-partition point file including the utility device number, kinds of service, and device addresses for each partition, means for providing a predetermined response corresponding to the contents of control commands for a utility device given from the terminal unit by making reference to the contents of the classified-by-partition point file, and an output section for outputting both the device address of a utility device to be controlled and the contents of control therefor in response to the control operation done on the control section.

According to another embodiment of the present invention, a building management system comprises a plurality of terminal units, each comprising a personal computer installed in a building, and a central station. Each terminal unit has a control section for inputting both an ID code designating a partition of the building which an operator is allowed to control and data specifying a utility device in the partition and control commands therefor, a response output section for outputting a response from the central station corresponding to the input received through the control section, a classified-by-partition point file including the utility device numbers, kinds of service, and device addresses for each partition, and means for providing a predetermined response corresponding to the control commands for a utility device given from the terminal unit by making reference to the contents of the classified-by-partition point file. The central station has a file designating a partition corresponding to the ID code, and an output section for outputting both the device address of a utility device to be controlled and the control commands therefor in response to the control operation performed on the control section.

With the terminal unit of the present invention, an operator can confirm his input of data, representative of a partition and the like, via the control section by comparison with the response presented on the response output section, thereby eliminating erroneous data input.

Figure 1:
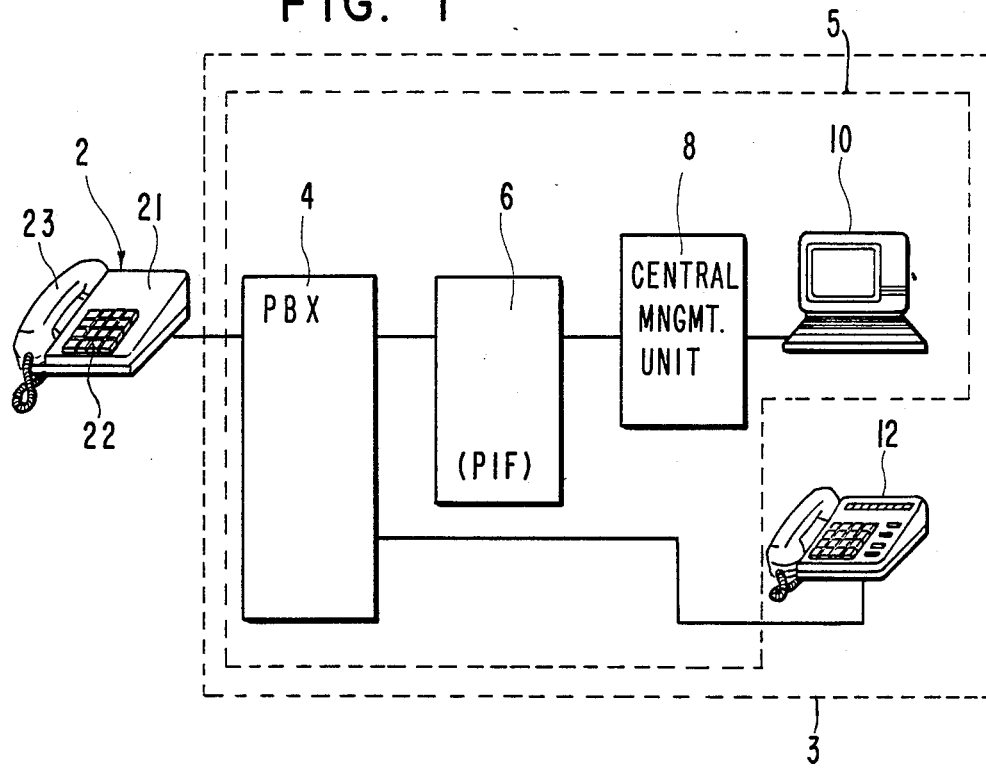
FIG. 1 is a block diagram of a communication system including a telephone set according to an embodiment of the present invention.
Figure 5:
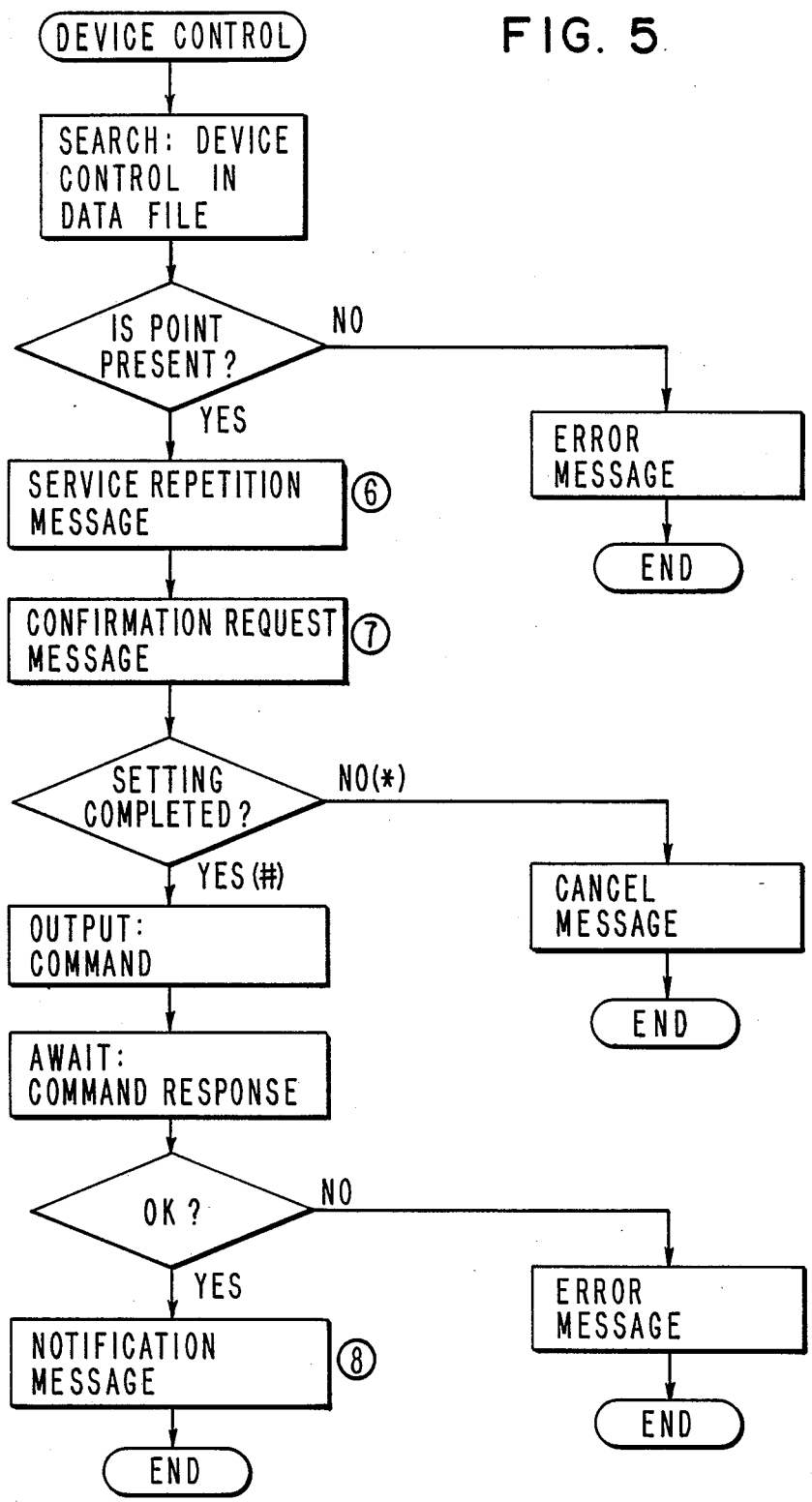
Figure 6:
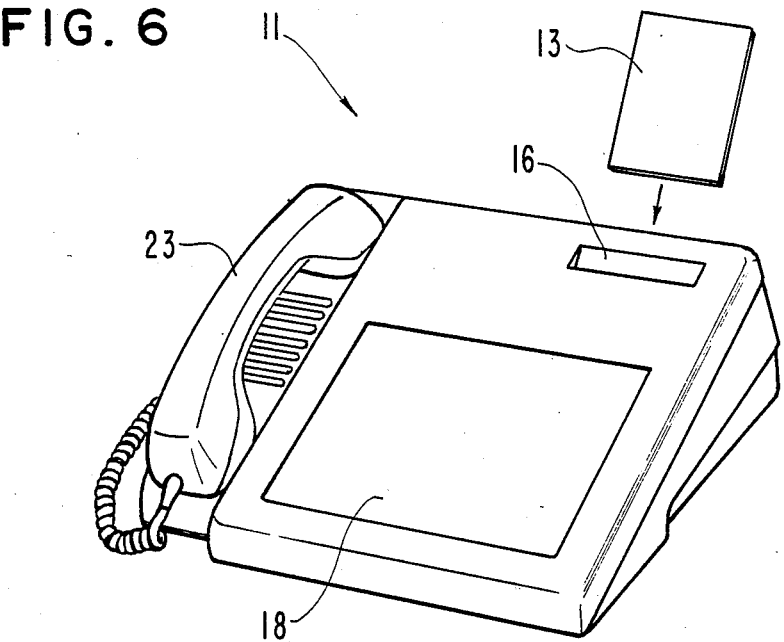
Figure 7:
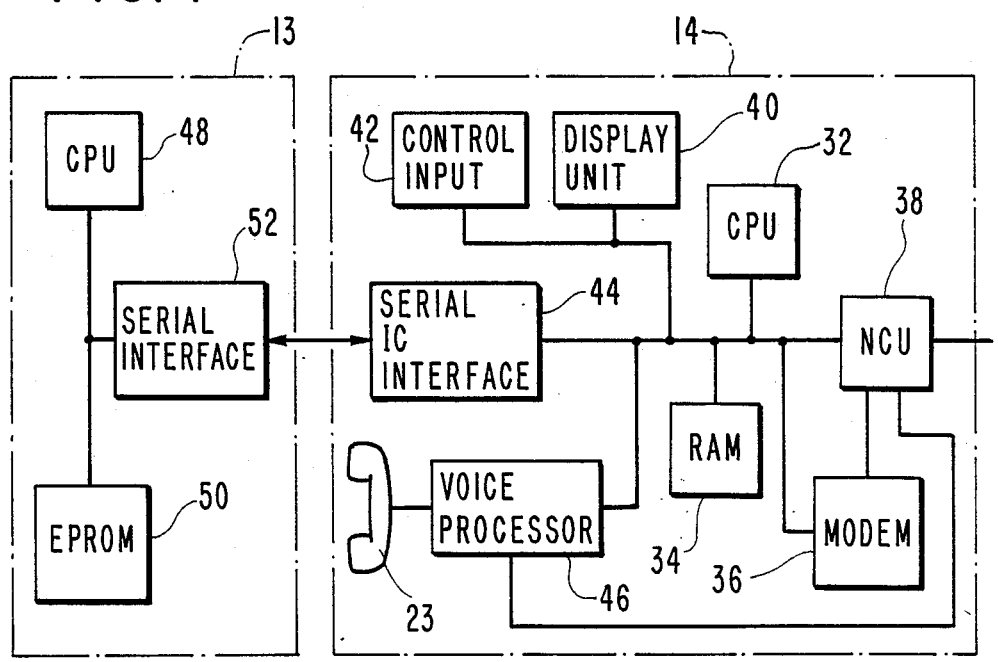
Figures 8, 10:
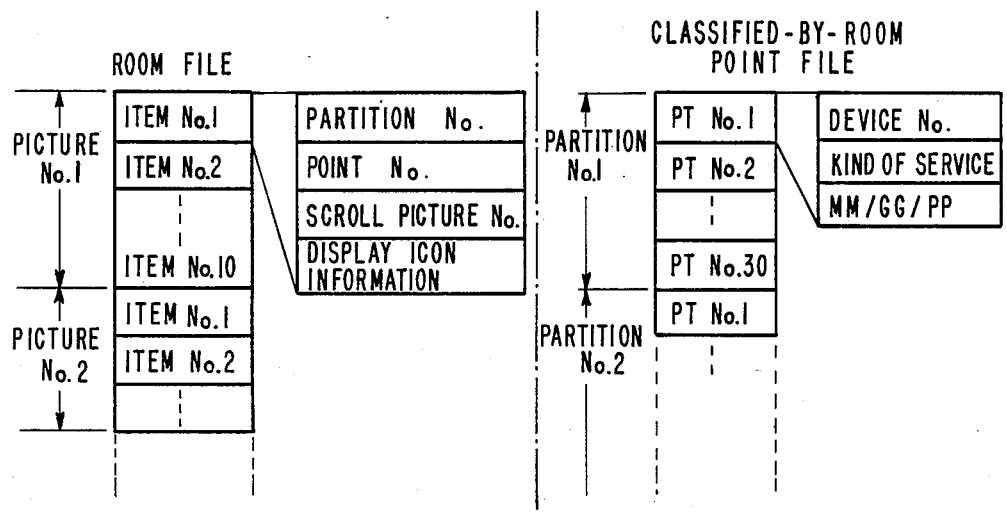

2 is a block diagram of the telephone set of FIG. 1;

3 is a diagram showing the memory allocation of a central management unit of FIG. 1;

FIG. 4 is a diagram showing the control operations performed on the side of the telephone set of FIG. 1 and the responses thereto;

FIG. 5 is a flowchart showing the operation of the system of FIG. 1;

FIG. 6 is a diagram of a telephone set with a display unit according to another embodiment;

FIG. 7 is a block diagram of the telephone set of FIG. 6;

FIG. 8 is a diagram showing the memory of a central management unit where the telephone of FIG. 6 is used;

FIGS. 9(a)–9(d) are diagrams showing the pictures displayed on the telephone set of FIG. 6, the control operations performed in relation to the individual pictures, and the responses thereto;

FIG. 10 is a diagram of icons presented on each display picture; and

Figure 11:
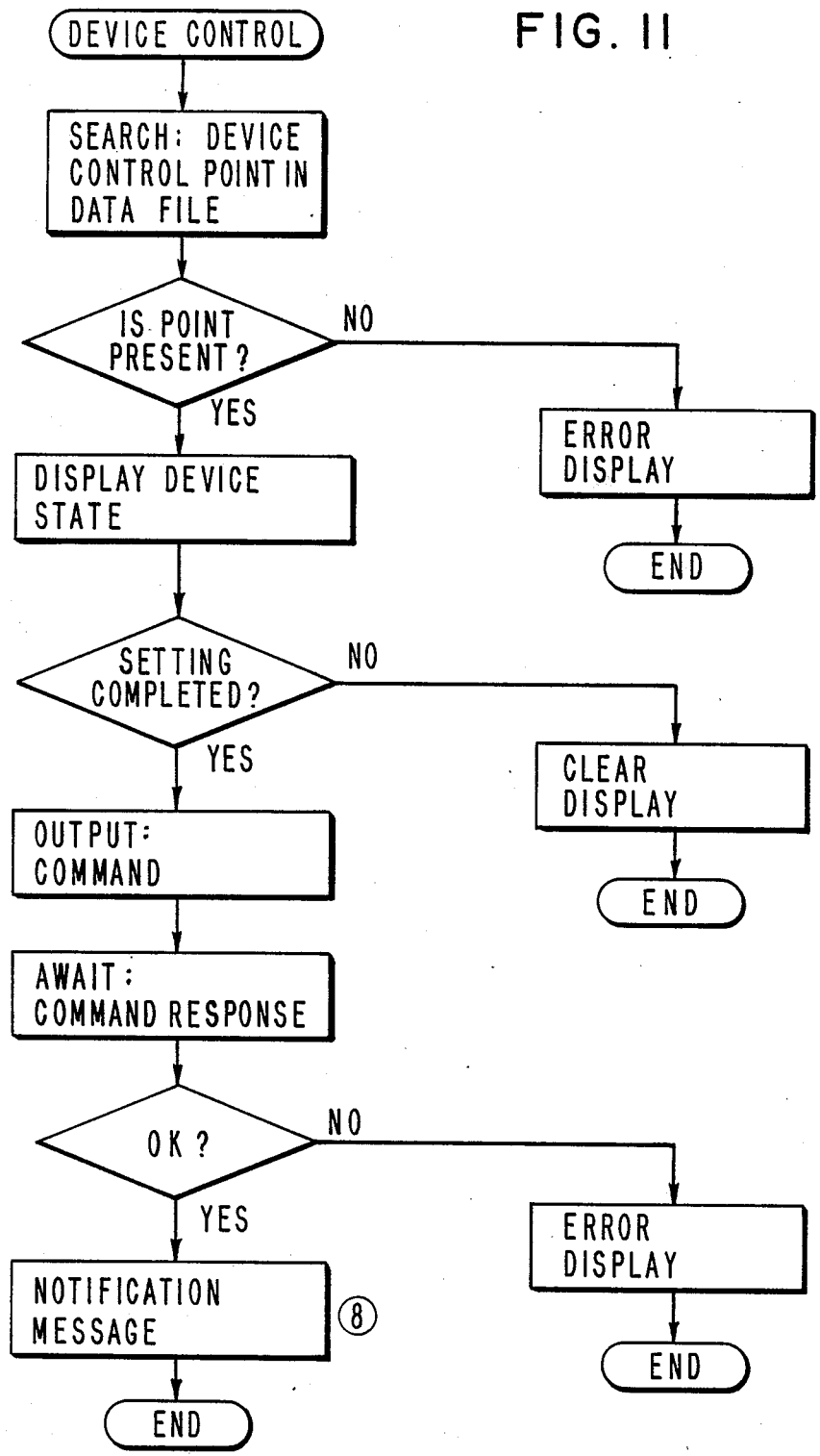

FIG. 11 is a flowchart showing a series of operations when the telephone set of FIG. 6 is used.

DESCRIPTION OF THE PREFERRED EMBODIMENTS

FIG. 1 illustrates a building management system including terminal units according to the present invention. A terminal unit (first telephone set 2) is installed in an appropriate location (e.g., a service entrance) of a building and connected with a private branch exchange (PBX) 4 also installed in the same building. Arranged on the upper side of a casing 21 of the telephone set 2 are a plurality of pushbuttons 22 marked with numbers, symbols or the like. Handset 23 rests in a left-end portion of the telephone set 2.

The PBX 4 couples the first telephone set 2 (the terminal unit) to a central station 3 of the system. The central station 3 includes a communication control unit 5 comprising a PBX interface (PIF) 6 connected with the PBX 4, a central management unit 8 for performing the foregoing building management, and a control terminal unit 10. The location of the central station 3 is determined based on the size of the system, that is, it may be provided in the building housing, the PBX 4, or in a different building. Further, the central station 3 may include a second telephone set 12 serving as a voice-mode communication terminal unit which is connected with the PBX 4.

Figure 2:
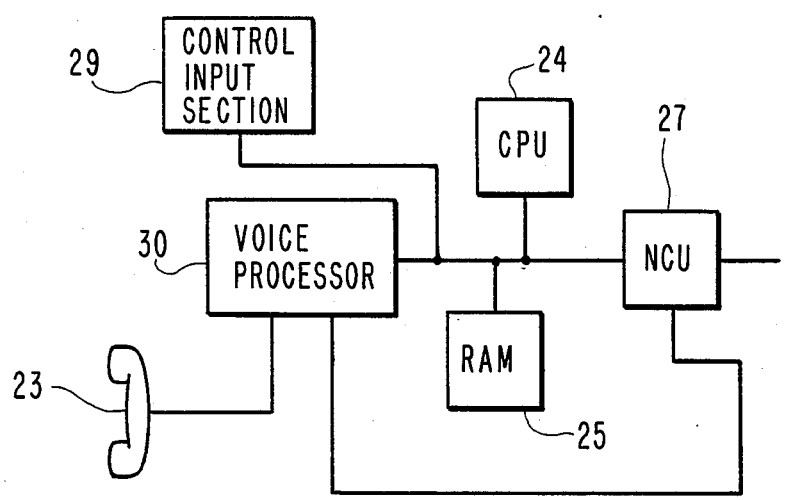

The first telephone set 2 transmits and receives signals, such as voice and data signals, to and from the central station 3 via PBX 4. As shown in FIG. 2, the telephone set 2 comprises a CPU 24 for controlling a communication operation, a random access memory (RAM) 25 for storing data and other information being transmitted and received between it and the central station 3 and other communication parties, a network control unit (NCU) 27 used for connection with communication lines, a control input section 29 comprising pushbuttons 22, and a voice processing section 30 connected to the handset 23. The second telephone set 12 operates similarly to first telephone set 2, transmitting and receiving signals, such as voice and data signals, to and from the terminal unit (first telephone set 2).

The terminal unit 21 (first telephone set 2) functions by operator input via the pushbuttons 22 in accordance with a voice-mode instruction from the central station 3.

FIG. 3 shows a memory allocation for the central station 3. Specifically, a memory unit provided in the central management unit 8 includes a room file for storing the partition information of each room of the building and a classified-by-partition or classified-by-room point file for storing the point information (the address of utility device being controlled by the system of FIG. 1) of each partition.

The contents of the room file are classified by assigning to the contents consecutive numbers so as to correspond to the individual partitions, and each partition is defined by a password and an ID code.

The contents of classified-by-room point file are also classified by affixing thereto consecutive numbers so as to correspond to the individual partitions. However, each partition information includes a given number of controllable points. Further, each point information includes data (point file details) representative of the device number, kind of service, and MM/GG/PP (device address). The selection of service (the selection of point type) designates how to control (e.g., whether to turn on or off) which device (address) of the subject partition. The kinds of service are, for example, air-conditioning control, lighting control, temperature measurement and humidity measurement, each distinguished by numbers 1 through 4, respectively.

Data representative of the state of each utility device (the ON/OFF of an air-conditioner, the measured value of temperature, etc.) corresponding to the data of MM/GG/PP included in the point file details are stored in a different file.

The building management system of FIG. 1 achieves the rationalization of management, labor saving, energy saving, and uniformalization of management level of the building facilities, allows simultaneous calling from the central station in case of emergency, extension-to-extension calling in the building, and exchange line calling, and controls the electric locks of each building, warning for prevention of crises, etc.

FIG. 4 illustrates an example of control operations performed when the telephone set 2 is used as the terminal unit of the building management system, and the voice-code response corresponding thereto.

First, the operator calls the central station 3 by manipulating the pushbuttons 21 of the telephone set 2 to input the extension number of the central station 3. In reply, a voice response ① is sent from the central station 3, and then, a voice request ② presented requesting input of the ID code at the telephone set 2. The operator inputs his ID code (e.g., the telephone number) and depresses the "#" button (the setting termination button; after the code number is inputted. This indicates that the complete ID code has been entered. Consequently, a voice response ③ for confirmation of the ID code is sent from the central station 3, and then, a voice request ④ is provided requesting the input of a password. The input of the password in addition to the ID code further ensures system security. In this example, a number designated for each tenant is used as a password.

When the operator inputs his password and presses the "#" button indicating that the password has been entered, the central station 3 confirms the password. After confirming the password, the central station 3 outputs a voice response ⑤11 requesting the operator to choose the service or the contents of control. In reply, the operator chooses one number (for example, "1" if the air-conditioning control is desired) representative of a desired control among the foregoing kinds of service (FIG. 3), and inputs that number, the device number (for example, "1" if No. 1 air-conditioning is to be controlled) representative of the subject of control, and the number (for example, "1" or "0" if the device is to be turned on or off) representative of the desired control operation, in that order. Consequently, the central station 3 outputs a voice response ⑥ which is a repetition of the contents of service request and then, a voice request ⑦ the operator's confirmation is output. When the operator depresses the "#" button, the central station 3 outputs a voice response ⑧ indicating that the subject service has been executed.

FIG. 5 is a flowchart showing the device control operation of the central station 3 corresponding to the input operation performed on the side of the telephone set 2. The illustrated process is executed when the operator, or the employee of a tenant, performs the foregoing input operation using the telephone set 2 installed in his room for the purpose of turning on/off the air-conditioner, lighting equipment, etc., provided in his room or changing the operation state thereof. In FIG. 5, numbers ⑥ through ⑧ correspond to the voice responses shown in FIG. 4.

Specifically, in the central management unit 8 of the central station 3, after the ID code and the password input by depressing the buttons of the telephone set 2 are confirmed and the service chosen by the operator is input as shown in FIG. 4, the device points kept in the data file are searched. If the result of search for the point is "No", an error message is output, and the process is terminated. This indicates that the operator has input a request to control a device that he is not authorized to control. If the result of the search for the point is "Yes", a service repetition message (⑥ of FIG. 4) is output and then a confirmation request message (⑦ of FIG. 4) is output. Thereafter, it is determined whether or not the input setting being done by the operator is completed. This determination is made by detecting which of the setting termination button "#" and cancel button "*" has been depressed. If it is determined that the cancel button "*" (No) has been depressed, a cancel message is output, and the process is terminated. Contrarily, if it is determined that the setting termination button "#" (Yes) has been depressed, a command is output, and a response is awaited. If the result of determining whether or not the response is "OK" (correct) is "No", an error message is output, and the process is terminated. Contrarily, if it is "Yes", a notification message (⑧ ] of FIG. 4) is output, and the process is completed.

As described above, according to the foregoing embodiment, the operator can control the state of operation of a specified utility device by an error-free positive control operations or by inputting the data, such as the ID code. This process is easy for the operator to understand and responds to the voice response to the input operation.

FIGS. 6 and 7 show a perspective view and block diagram, respectively, of a telephone set 11 with a display unit according to another embodiment of the present invention.

Telephone set 11 is small in size and is put into operation by insertion of an IC card 13. Provided inside the casing of the telephone set is a control block 14 (FIG. 7) which is actuated upon insertion of the IC card 13 to fetch a program and/or data from its memory and execute a series of operations hereinafter described. Provided on the upper side of the casing are an IC card insertion opening 16 and a rectangular display section 18. A handset 23 is adapted to rest in a left-hand portion of the telephone set.

As shown in FIG. 7, the control block 14 transmits and receives voice and data signals through the PBX 4 (FIG. 1) to and from the central station 3. The components of the control block are a CPU 32 for controlling a communication operation, a memory unit (RAM) 34 for storing data and other information transmitted to and received from the central station 3 and other communication parties, a modulator-demodulator (MODEM) 36 for transmitting and receiving digital signals for picture display, a network control unit (NCU) 38 used for connection with communication lines, a liquid crystal display unit 40 forming a part of the foregoing display section 18, a control input section (a touch panel) 42 made of a plurality of pressure-sensitive elements superposed on the screen of the display section 18, an IC interface 44 for reading out information from the IC card 13, and a voice processing section 46 connected with the handset 23.

The IC card 13 stores a variety of procedures and information necessary for communication made by the control block 14 of the telephone set. The components of the IC card 13 are a CPU 48 for controlling an information read/write operation, a memory unit (EPROM) 50 for storing the foregoing procedures and information and a serial interface 52 which is connected with the IC interface 44 of the control block 14 to send information serially thereto. The memory unit 50 can store information (inclusive of at least the telephone numbers of other parties) necessary for communication with the central station 3 and other parties, programs, ID codes (inclusive of at least the telephone number of his own) necessary for the central station to specify the subject of communication, etc. This information, programs and data can be stored using a standard writing apparatus.

When using the IC card 13, it is inserted into the insertion opening 16 of the telephone set. Where the casing of the telephone set 11 is flat and its height is smaller than the length of the card shown in FIG. 6, the IC card 13 is inserted obliquely.

When the telephone set 11 is used in place of telephone set 2 in the system shown in FIG. 1, its function as the terminal unit is achieved by the operator controlling the touch panel 42 based on a picture displayed on the display section 18 in accordance with the signal from the central station 3. In this case, a memory allocation on the side of the central station 3 is as shown in FIG. 8. That is, the memory unit of the central management unit 8 includes, as the contents of storage, a room file for storing information pertinent to a given number of pictures for each room of the building and a classified-by-room point file for storing the point (device address) information for each partition.

The contents of the room or picture file are classified by affixing consecutive numbers to individual pictures, and each picture is made of a given number of items (ten in the case of picture No. 1 of FIG. 8). Each item includes the partition number, point number, scroll picture number, and display icon (pixel) information. The contents of the classified-by-room point file can be defined by two pieces of information: the partition number and the point number.

As in FIG. 3, the contents of the classified-by-room point file shown in FIG. 8 are classified by affixing consecutive numbers for individual partitions, and each partition includes a given number of points. Each point includes the data (point file details) of each device, including the device number, kind of service, and MM/GG/PP (device address). The selection of service (the selection of point type) selects how to control (e.g., whether to turn on or off) which device (address) of the subject partition.

FIGS. 9(a)–9(d) show a variety of picture displays and the contents of control provided if the telephone set 11 of FIG. 6 is used as the terminal unit of the foregoing building management system, and FIG. 10 shows a variety of display icons displayed on the screen.

A picture displayed at the time of input includes only the symbols representing devices in the subject partition which the operator is allowed to control. That is, it is not necessary to perform such a complicated operation as in the prior art where the MM/GG/PP must be designated. Thus, the risk of miscontrolling is lessened because the extent to which the operator can control, i.e. the number of devices that the operator can control, is limited.

The telephone set 11 is initialized upon insertion of the IC card 13, and the data and the like stored in the IC card 13 are read out by the CPU 42. Then, the CPU 14 presents a menu display on the screen of the display section 18. This menu display includes a list, predetermined operations of which the operator can perform. The operations which the operator desires to control are then chosen by the operator from this list. When the operator chooses the building management by touching a predetermined portion of the menu display screen with a finger, the telephone set 11 communicates with the central station 3 to have it prepare for communication. Then, when the operator performs a certain control operation, the telephone set 11 presents such a picture as illustrated in FIG. 9(a) on its display section 18. A certain control operation means inputs the 30 foregoing ID code and/or password correctly via the touch panel.

Then, if the operator desires to control, for example, a fan coil unit (FCU) in the picture of FIG. 9(A), he touches the portion of its display icon with his finger. As a result, the display picture of the telephone set 11 scrolls to the display illustrated in FIG. 9(B), so that a graphic picture of air-conditioning and lighting is displayed. This picture indicates the current state of operation of each utility device. Then, if the operator desires to turn on (to start) the left-end fan coil unit currently not in use, he touches, the portion of its display icon with his finger. The display icons of "ON" and "OFF" appear in a lower portion of the screen. When the operator touches the "ON" portion with his finger, the display of "FAN COIL UNIT is OFF" on the screen changes to "FAN COIL UNIT is ON" and at the same time the subject fan coil starts to operate.

FIG. 11 is a flowchart showing the device control operation of the central station 3 corresponding to the data input operation performed on the side of the telephone set 11, as described above.

That is, in the central management unit 8 of the central station 3, after the confirmation of the ID code and password as a consequence of the card insertion into the telephone set and the subsequent data input operation, when the item chosen by the operator with the aid of the picture of FIG. 9(A) is input, the device point is searched in the data file. If the result of search for the point is "No", an error display is presented on the display screen indicating that the selected device is outside of the realm of the operator's authorized control, and the process is terminated. Contrarily, if it is "Yes", the state of the utility device is displayed (FIG. 9(B)) and then it is determined whether or not the input setting being performed by the operator has been terminated (FIG. 9(C)). The result of the determination depends on which of the setting termination icon EX and cancel icon CL has been touched with the operator's finger. If the result of examination is "No" (CL), the screen is cleared and the process is terminated. Contrarily, if it is "Yes" (EX), a command is output and its response is awaited. In determining whether or not the response is OK (correct), if the result of determination is "No", an error display is presented, and the process is terminated. If it is "Yes", the display (FIG. 9(D)) of "Yes" is presented, and the process is completed.

As described above, according to the embodiment of FIG. 6, the operator can control the on-off state, operation, etc. of a specified utility device accurately and readily by touching the touch panel with the aid of the simple display.

Although the present invention has been described with reference to the above embodiments, the present invention should not be limited to those embodiments. For example, the terminal unit may be a personal computer or a different type data terminal unit, instead of the telephone set of the above examples.

If the terminal unit is a personal computer, the classified-by-room point file and the means for providing a predetermined response for the terminal unit can be included as an integral part of the personal computer; thus, they are not necessary to be provided on the side of the central station 3.

Since the terminal unit according to the present invention is configured as described above, the user of the various facilities of the building does not need to remember specific data relating to a device to be controlled. The operator is prohibited from controlling devices which he is not authorized to control. There is no need to consult a separate list when controlling the terminal unit in contrast to the prior art, and the user can control the state and the like of a desired utility device reliably through a simple control operation. Thus, the present invention can provide enhanced controllability of a building management system.

What is claimed is:

1. A building management system for managing operation of a plurality of utility devices in a building divided into partitions, comprising:
    at least one terminal means for sending and receiving signals including commands; and
    central station means for coordinating control of the plurality of utility devices based on the commands sent from said terminal means;
    said terminal means comprising:
        control means for supplying to said central station means an ID code designating a predetermined partition of the building and data indicating one of the utility devices in the predetermined partition and control commands for the one of the utility devices; and
        response output means for outputting responses from said central station means; and
    said central station means comprising;
        a building partition file designating the predetermined partition of the building corresponding to the ID code;
        a classified-by-partition point file including utility device numbers, kinds of service, and addresses for each utility device in the predetermined partition;
        means for providing a predetermined response corresponding to the control commands for the one of the utility devices indicated by the data from said terminal means by making reference to said classified-by-partition point file; and output means for outputting an address of the one of the utility devices and the control commands therefor.

2. The building management system according to claim 1, wherein said response output means comprises a voice output means for outputting a voice signal response corresponding to an input operation by an operator.

3. The building management system according to claim 1, wherein said response output means includes a picture display means for displaying pictures corresponding to an input operation of an operator.

4. The building management system according to claim 1,
wherein said central station means further includes indication means for providing result signals indicating results of the control commands, and
wherein said terminal means further includes display means for displaying the results of the control commands based on said result signals from said central station means.

5. A building management system for managing operation of a plurality of utility devices in a building divided into partitions, comprising:
at least one terminal means for sending and receiving signals, comprising:
control means for supplying and ID code designating a predetermined partition of the building and data indicating one of the utility devices in the predetermined partition and control commands for the one of the utility devices;
response output means for outputting responses;
a classified-by-partition point file including utility device numbers, kinds of service, and addresses for each utility device in the predetermined partition; and
means for providing a predetermined response corresponding to the control commands for the one of the utility devices indicated by the data from said terminal means by making reference to said classified-by-partition point file; and
central station means for controlling the utility devices based on the ID code and the data from said terminal means, comprising:
a building partition file designating a paration of the building corresponding to the ID code; and
output means for outputting the address of the one of the utility devices and the control commands for the one of the utility devices in response to receipt of the ID code and the data from said terminal means.

6. A building management system for managing operation of a plurality of utility in a building divided into partitions, comprising:
a plurality of terminal means for sending and receiving signals, each comprising:
control means for supplying an ID code designating a predetermined partition of the building and data indicating one of the utility devices in the predetermined partition and control commands for the one of the utility devices; and
response output means for outputting responses; and
central station means for coordinating control of the utility devices based on input from said terminal means, comprising:
a building partition file designating the predetermined partition of the building corresponding to the ID code;
a classified-by-partition point file including utility device numbers, kinds of service, and addresses for each utility device in the predetermined partition;
means for providing a predetermined response corresponding to the control commands for the one of the utility devices indicated by the data from said terminal means by making reference to said classified-by-partition point file; and
output means for outputting the address of the one of the utility devices and the control commands therefor.

* * * * *

UNITED STATES PATENT AND TRADEMARK OFFICE
CERTIFICATE OF CORRECTION

PATENT NO. : 4,918,615
DATED : April 17, 1990
INVENTOR(S) : Suzuki et al.

It is certified that error appears in the above-identified patent and that said Letters Patent is hereby corrected as shown below:

Col. 3, line 1, after "memory" insert --allocation--;

Col. 3, line 33, after "housing" delete --,--;

Col. 4, line 51, before "password"

insert --complete--;

Col. 3, line 53, delete "terminal unit 21", and "(first telephone set 2)", insert --first telephone set 2--;

Col. 4, line 54, delete "11".

UNITED STATES PATENT AND TRADEMARK OFFICE
CERTIFICATE OF CORRECTION

PATENT NO.  : 4,918,615
DATED       : April 17, 1990
INVENTOR(S) : Suzuki et al.

It is certified that error appears in the above-identified patent and that said Letters Patent is hereby corrected as shown below:

Col. 5, line 39, delete "]";

Col. 5, line 44, change "operations" to --operation,--;

Col. 8, line 19, change "providing." to --providing--;

Col. 10, line 4, change "paration" to --partition--.

Signed and Sealed this

Twenty-first Day of April, 1992

*Attest:*

HARRY F. MANBECK, JR.

*Attesting Officer*     *Commissioner of Patents and Trademarks*